Figure 1:
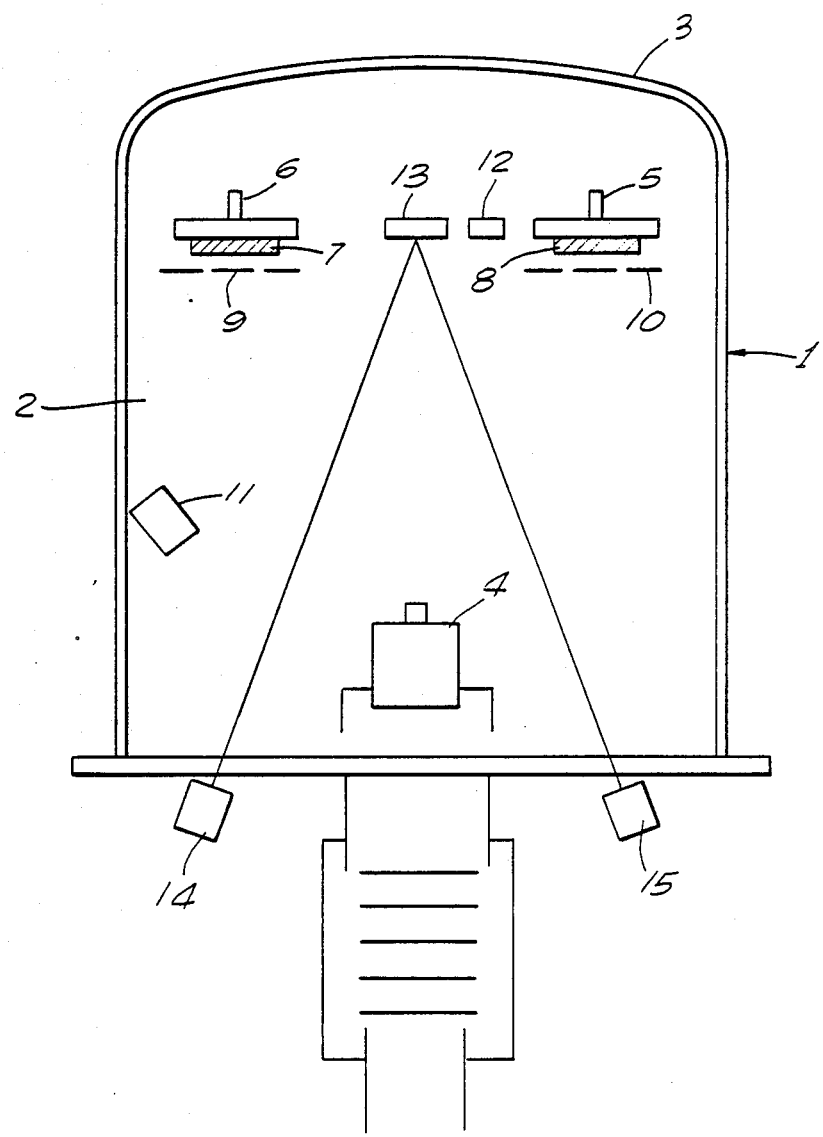
Figure 2:
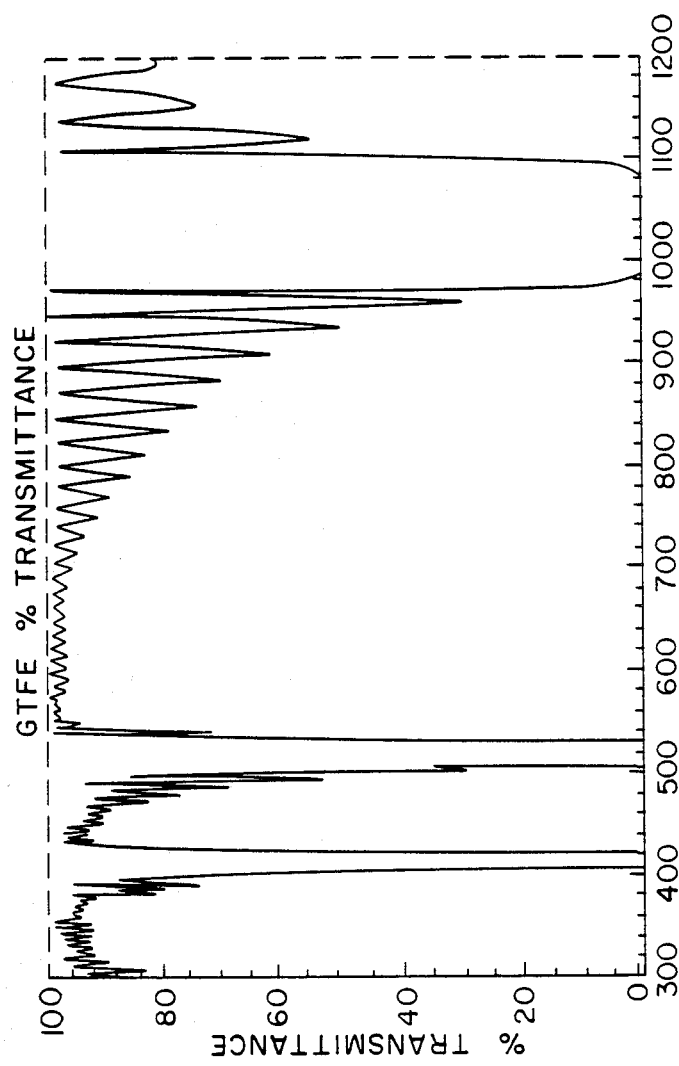
Figure 3:
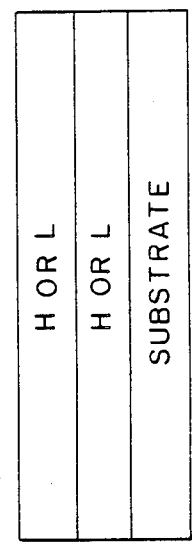

United States Patent [19]
Hettich et al.

[11] Patent Number: 4,769,290
[45] Date of Patent: Sep. 6, 1988

[54] HIGH EFFICIENCY REFLECTORS AND METHODS FOR MAKING THEM

[75] Inventors: Herbert L. Hettich; Samuel F. Pellicori, both of Santa Barbara, Calif.

[73] Assignee: Santa Barbara Research Center, Goleta, Calif.

[21] Appl. No.: 1,019

[22] Filed: Jan. 6, 1987

Related U.S. Application Data

[63] Continuation-in-part of Ser. No. 772,585, Sep. 4, 1985, abandoned.

[51] Int. Cl.[4] .................. B32B 17/06; B32B 7/02; G02B 5/22; G02B 1/10
[52] U.S. Cl. ........................ 428/432; 428/212; 428/215; 428/333; 428/412; 428/701; 350/1.6; 350/164; 350/601
[58] Field of Search ............... 428/212, 215, 333, 412, 428/432, 448, 701, 702; 350/1.6, 164, 600, 601, 166

[56] References Cited

U.S. PATENT DOCUMENTS

| | | | |
|---|---|---|---|
| 2,412,496 | 12/1946 | Dimmick | 350/166 |
| 2,552,185 | 5/1951 | Koch | 350/1.6 X |
| 3,410,626 | 11/1968 | Magrath | 350/166 |
| 3,504,959 | 4/1970 | Hennessey | 350/1.6 X |
| 4,196,246 | 4/1980 | Takayama et al. | 428/448 X |
| 4,659,178 | 4/1987 | Kyogoku | 350/166 |

FOREIGN PATENT DOCUMENTS

| | | | |
|---|---|---|---|
| 64843 | 4/1985 | Japan | 428/432 |
| 2070275 | 9/1981 | United Kingdom | 350/1.6 |

OTHER PUBLICATIONS

P. Baumeister et al, "Use of Hafnium Dioxide in Multilayer Dielectric Reflectors for the Near UV", *Appl. Optics*, vol. 16, No. 2, Feb. 1977, pp. 439–444.

*Primary Examiner*—John E. Kittle
*Assistant Examiner*—Susan S. Rucker
*Attorney, Agent, or Firm*—W. C. Schubert; V. G. Laslo; A. W. Karambelas

[57] ABSTRACT

An article of manufacture includes a substrate carrying at least two coating layers, one layer being of approximately quarter wave optical thickness, the other layer of approximately two quarter wave optical thickness, with the layers alternating between a material such as a dielectric having a first index of refraction and a second material such as a dielectric having a second index of refraction lower than the first index of refraction. These layers form a filtering system which removes narrow bands of light such as laser wavelengths by efficient reflection while permitting the remainder of the light spectrum to pass through the article. The coating layers have optical thicknesses and indices of refraction appropriate to reflect more than 99% of incident light at one or more predetermined wavelengths of light in the range of about 300 to about 1,200 nanometers and to transmit a substantial amount of all other incident light in the range. These articles are made by an electron beam evaporation technique under vacuum and under controlled conditions of temperature, partial pressure of oxygen, and deposition rates.

18 Claims, 2 Drawing Sheets

FIG. I

HIGH EFFICIENCY REFLECTORS AND METHODS FOR MAKING THEM

BACKGROUND OF THE INVENTION

This application is a continuation-in-part of U.S. patent application Ser. No. 772,585, filed Sept. 4, 1985, now abandoned and entitled, "High Efficiency Reflectors and Methods for Making Them."

This invention relates to high efficiency reflector articles and methods for making them. In preferred embodiments, these reflectors reflect more than 99.99% of incident light at one or more specific wavelengths in the range of about 300 to about 1,200 nanometers while admitting a substantial portion of incident light at all other wavelengths in this range.

The articles of this invention comprise a substrate carrying a group of coating layers alternating between a layer of approximately quarter wave optical thickness and a layer of approximately two quarter-wave optical thickness. The coating layers alternate between a material, preferably a dielectric material, having a first index of refraction, and another material, preferably also a dielectric material, having a second index of refraction greater than the first index of refraction. The coating layers having the first, or lower, index of refraction are preferably about twice the optical thickness of the coating layers having the second, or higher, index of refraction. The coating layers have predetermined optical thicknesses and predetermined indices of refraction sufficient to reflect more than 99%, and preferably more than 99.99% of incident light, at one or more predetermined wavelengths in a specific range, while transmitting a substantial quantity, and preferably at least about 75% on average, and more preferably about 90% on average, of all other incident light in the same range. In preferred embodiments, this specific range is about 300 to about 1,200 nanometers.

In preferred embodiments, the substrates in these articles are selected from the group consisting of glass and polymeric materials, particularly polycarbonates.

In preferred embodiments, each of the layers of higher index of refraction are of quarter wave optical thickness and each of the layers of lower index of refraction are of two quarter wave optical thicknesses at a wavelength $\lambda_0$, called the design wavelength. At fractional values of $\lambda_0$, the articles of this invention have one or more narrow reflection bands, meaning a small range of wavelengths of light, at which reflection exceeds 99%, and preferably 99.99%, within the range of about 300 to about 1,200 nanometers while transmitting a substantial percentage of incident light at all other wavelengths in this range. Reflection bands lie at wavelengths equal to $3 \lambda_0/4$ m, where m is an integer such as 1, 2, 4, 5, 7 or 8.

In one embodiment, where the article of this invention reflects more than 99% of incident light at wavelengths lying in a narrow bandwidth of wavelengths around 1,064 nanometers, 532 nanometers and 358 nanometers, the second and third order bands of reflection are preferred as the quarter wave and two quarter wave optical thickness for the alternating layers in the article. Made in this way, the article reflects more than 99% of incident light at the desired, predetermined wavelengths of incident light where the angle of incidence is in the range of about 0° to about 25°.

The bandwidth of wavelengths around the predetermined wavelengths of reflectance exceeding 99% decreases as the order number increases. To obtain the desired percentage of reflectance where incident light on the article is at an angle other than 0°, the bandwidth must be selected to accommodate the expected and desired range of incidence of light on the article. For example, where the layers of first index of refraction have an index in the range of about 1.43 to about 1.5, such as for silicon dioxide, free of water, or evaporation glass such as Schott 8329, and where the alternating layers have an index of refraction in the range of about 1.9 to about 2.3, such as for tantalum oxide, titanium oxide and hafnium oxide, the bandwidth is in the range of 25 to 50 nanometers for incident light in the range of about 300 to about 1,200 nanometers. The breadth of each narrow bandwidth of wavelengths where more than 99% of incident light is reflected depends in part on the ratio of the indices of refraction in the alternating layers. For incident light in the range of about 300 to about 1,200 nanometers, the ratio of indices of refraction between the layers of higher index and those of lower index should be from about 1.6 to about 1.27.

In preferred embodiments, the articles include a plurality of groups of coating layers, each group comprising layers of alternating indices of refraction. For embodiments of the article intended to reflect more than 99% of incident light in narrow bandwidths of wavelengths around 1,064 nanometers, 532 nanometers and 358 nanometers, the article preferably includes in the range of about 10 to about 20 groups of alternating layers. Each group has the configuration HL, where L is a layer of material of lower index of refraction and is twice the optical thickness of the H layer, and H is a layer of material of higher index of refraction, and is of quarter-wave optical thickness. For such embodiments, the design wavelength, $\lambda_0$, is 1.43 micrometers. For an article intended to reflect light from a ruby laser, the design wavelength, $\lambda_0$, is 960 nanometers. To produce an article that reflects narrow bandwidths of light at two or more design wavelengths, the article is made with two different kinds of groups of layers, one kind designed to reflect narrow bandwidths of light around the first design wavelength, the second group to reflect wavelengths of light around the second design wavelength.

These articles are preferably made by electron beam evaporation in a vacuum zone according to accepted practice in the art of optical coating deposition, with the starting vacuum preferably below $1 \times 10^{-5}$ Torr. Such a vacuum can be established with a diffusion pump. The substrate is attached to a rotatable holder inside the vacuum zone, and an electron beam evaporation source inside the zone evaporates and deposits the materials, in layers of predetermined, desired optical thickness onto the substrate. Layer thicknesses are monitored and controlled with an optical reflectance monitor. The deposition rate of the layers is measured with a suitable means such as a quartz crystal. A partial atmosphere of oxygen is maintained in the zone to insure proper stoichiometric composition of each layer as the layer condenses on the substrate.

Proper control of evaporation rate, oxygen partial pressure, starting materials and substrate mounting in the zone minimizes the formation of stresses in the layers deposited on the substrates particularly if the substrate is susceptible to damage from heating. For example, with polycarbonate, the temperature should be maintained within the vacuum zone below about 100°

C. The partial oxygen pressure inside the vacuum zone should be at or below $2\times10^{-4}$ Torr ±20%. The deposition rates for the layers should be in the range of about 5 to about 10 angstroms per second. Moreover, the substrate should be clean and dry to insure good adhesion at low temperature of the materials to be coated onto the substrates. Proper preparation of the materials to form the layers on the substrate is also advisable. For example, where titanium oxide is used, the starting material should be premelted. Silicon dioxide should be in the form of solid hemispheres of silica, free of water. The alternate, Schott evaporation glass 8329, is preferably in the form of solid glass disks.

During the electron beam evaporation coating, a reflective mask placed between the substrate and the electron beam source reduces the temperature of the substrate by reflecting radiant heat originating at the electron beam evaporation source.

The accompanying drawing shows, in diagrammatic form, equipment for effecting the manufacture of the articles by electron beam evaporation.

The drawing shows the presently preferred embodiment for the electron beam evaporation apparatus, generally designated 1. Inside vacuum jar 3 is vacuum zone 2 and electron beam evaporation source 4. Source 4 includes a plurality of holders for the materials from which the layers on the substrate are to be formed. Rotatable, planetary substrate holders 5 and 6 have substrates 7 and 8, respectively, attached to them. Heat shields 9 and 10, placed between substrates 7 and 8 and electron beam source 4, reduce the exposure of the substrate to radiated heat from the electron beam source. Thermocouple 11 permits continuous monitoring of temperature inside vacuum zone 2, for this temperature should be below that at which damage to the substrate results. Quartz crystal 12 monitors the rate at which the deposition of the materials on the substrate takes place.

Light source 14 directs a beam of light having wavelengths in the range 300 to 1,200 nanometers at reference substrate 13. Detector/amplifier 15 monitors the light reflected from reference substrate 13, providing a means of accurately monitoring the layer thicknesses.

EXAMPLE

Utilizing the vacuum system described above, we prepared a high efficiency coating of 68 alternating layers of titanium dioxide and silicon dioxide on a substrate made of glass. The titanium dioxide layers were all of quarter wave optical thickness at the design wavelength, and the silicon dioxide layers were at two quarter wave optical thickness at the same design wavelength. The design wavelength of one stack of 34 layers was 1,440 nanometers and resulted in a reflection band that provided greater than 99.9% reflectance on average between the wavelengths of light at 525 nanometers and 540 nanometers. The design wavelength of the other stack of 34 layers was 480 nanometers and resulted in 99.9% reflectance of light on average between the wavelengths of layers at 670 nanometers and at 710 nanometers. Between these reflectance bands, the light transmission on average was 75% in the region of wavelengths where the human eye is most sensitive.

What is claimed is:

1. An article of manufacture comprising a substrate selected from the group consisting of glass and polymeric materials carrying at least two coating layers, one layer being of approximately quarter wave optical thickness, and the other being of approximately two quarter wave optical thickness, said layers alternating between a material having a first index of refraction and a material having a second index of refraction lower than said first index of refraction, said coating layers having optical thicknesses and indices of refraction suffficient to reflect more than 99% of incident light at substantially all wavelengths within one or more predetermined bandwidths of wavelengths, said bandwidths having a width of up to about 50 nanometers, and to transmit a substantial amount of all other incident light.

2. The article of claim 1 futher comprising in the range of about 10 to about 20 repeating groups of said alternating coating layers.

3. The article of claim 2 wherein said first index of refraction is in the range of about 1.9 to about 2.3, and said second index of refraction is in the range of about 1.43 to about 1.5.

4. The article of claim 3 wherein said first layer is selected from the group consisting of tantulum oxide, titanium oxide and hafnium oxide, and said second layer is silicon dioxide or Schott evaporation glass 8329.

5. The article of claim 4 wherein said article reflects more than 99% of incident light in narrow bandwidths of light wavelengths around 1,064 nanometers, 532 nanometers and 358 nanometers.

6. The article of claim 5 wherein said narrow bandwidths are of sufficient breadth to reflect said more than 99% of incident light where the angle of incidence of said incident light is in the range of about 0° to about 25°.

7. The article of claim 1 wherein each of said layers is a quarter wave optical thickness at a wavelength $\lambda_0$, and wherein said article has a reflection band of said more than 99% of incident light of at least one wavelength equal to $3\lambda_0/4$ m, wherein m is an integer 1, 2, 4, 5, 7 or 8.

8. The article of claim 1 wherein said substrate is polycarbonate or glass; said first layer is selected from the group consisting of tantalum oxide, titanium oxide, and hafnium oxide, and has an index of refraction in the range of about 1.9 to about 2.3, and said second layer is silicon dioxide with an index of refraction in the range of about 1.43 to about 1.5, and wherein said article reflects more than 99.99% of incident light in narrow bandwidths of wavelengths of incident light around 1,064 nanometers and 532 nanometers where the angle of incidence of the incident light is in the range of about 0° to about 25°.

9. The article of claim 1 made by electron beam evaporation, under vacuum, of said materials of first and second indices of refraction.

10. The article of claim 9 wherein said vacuum is below $2\times10^{-4}$ Torr; layer thicknesses are monitored and controlled with an optical reflectance monitor; deposition rate is measured with a quartz crystal; a partial pressure of oxygen is maintained within the vacuum zone, said partial pressure being not greater than about $2\times10^{-4}$ Torr ±20%; the deposition rate of said materials is controlled to a value within the range of about 5 to about 10 angstroms per second; and the temperature of said substrate is maintained below a temperature at which said substrate would be damaged.

11. An article of manufacture comprising a substrate selected from the group consisting of glass and polymeric materials carrying at least two coating layers, with one layer being of approximately quarter wave optical thickness, and the other layer of approximately two quarter wave optical thickness, said layers alternating between a material having a first index of refraction and a material having a second index of refraction lower than said first index of refraction, said coating layers having optical thicknesses and indices of refraction sufficient to reflect more than 99% of incident light at substantially all wavelengths within one or more predetermined bandwidths of wavelengths, said bandwidths having a width of up to about 50 nanometers, said bandwidths being of sufficient breadth to reflect more than 99% of incident light, where the angle of said incident light is in the range of about 0° to about 25° and to transmit a substantial amount of all other incident light.

12. The article of claim 11 wherein said first index of refraction is in the range of about 1.43 to about 1.5, and said second index of refraction is in the range of about 1.9 to about 2.3.

13. The article of claim 11 wherein said first layer is selected from the group consisting of tantalum oxide, titanium oxide and hafnium oxide, and said second layer is silicon dioxide.

14. The article of claim 11 wherein said article reflects more than 99% of incident light in narrow bandwidths of light wavelengths around 1,064 nanometers, 532 nanometers and 358 nanometers.

15. An article of manufacture comprising a substrate selected from the group consisting of glass and polymeric materials carrying at least about 10 repeating groups with each group comprising at least two coating layers being of approximately two quarter waves optical thickness, and the other layer being of approximately one quarter wave optical thickness, said layers alternating between a material having a first index of refraction and a second index of refraction, lower than said first index of refraction, said coating layers having optical thicknesses and indices of refraction sufficient to reflect more than 99% of incident light at substantially all wavelengths within one or more predetermined bandwidths of wavelengths, said bandwidths, having a width of up to about 50 nanometers, and to transmit a substantial amount of all other incident light.

16. The article of claim 15 wherein said first index of refraction is in the range of about 1.9 to about 2.3 and said second index of refraction is in the range of about 1.43 to about 1.5.

17. The article of claim 15 wherein said first layer is selected from the group consisting of tantalum oxide, titanium oxide and hafnium oxide, and said second layer is silicon dioxide.

18. The article of claim 15 wherein said article reflects more than 99% of incident light in narrow bandwidths of light wavelengths around 1,064 nanometers, 532 nanometers and 358 nanometers.

* * * * *